United States Patent [19]

Miller et al.

[11] Patent Number: 4,954,707

[45] Date of Patent: Sep. 4, 1990

[54] SYSTEM FOR USE WITH SOLID STATE DOSIMETER

[75] Inventors: Steven D. Miller, Richland; Joseph C. McDonald, Pasco; Fred N. Eichner, Kennewick; Paul L. Tomeraasen, Richland, all of Wash.

[73] Assignee: Battelle Memorial Institute, Ohio

[21] Appl. No.: 213,245

[22] Filed: Jun. 29, 1988

[51] Int. Cl.⁵ .............................................. G01T 1/115
[52] U.S. Cl. .................................. 250/337; 250/484.1
[58] Field of Search .................... 250/337, 484.1, 487.1

[56] References Cited

U.S. PATENT DOCUMENTS

| | | | |
|---|---|---|---|
| 3,375,372 | 3/1968 | Miyashita | 250/83.3 |
| 3,388,252 | 6/1968 | Medlin | 250/71 |
| 3,415,990 | 12/1968 | Watson | 250/71.5 |
| 3,601,610 | 8/1971 | Nakamura et al. | 250/71 |
| 3,709,663 | 1/1973 | Wendricks | 250/484.1 |
| 3,835,329 | 9/1974 | Moran et al. | 250/484 |
| 4,458,154 | 7/1984 | Sugita et al. | 250/484 |

OTHER PUBLICATIONS

Chaudhary et al., "An Apparatus for Phosphorescence Decay and Thermoluminescence Study at Ambient and Liquid Nitrogen Temperature", Cryogenics, vol. 17, No. 7 (Jul. 1977) p. 419.
Tatake et al., "A Variable Temperature Cryostat for Thermoluminescence Studies", J. Phys. E. (GB), vol. 4, No. 10 (Oct. 1971) p. 755.
Sanzelle et al., "Appareillage Destine a l'Etude de la Thermoluminescence Entre 77K et 773K", Revue de Physique Appliquee, vol. 10, No. 1975, pp. 471–473.
Rao et al., "Optically Stimulated Luminescence Dosimetry", Radiation Protection Dosimetry, vol. 6, No. 1–4, pp. 66–66.
Pradhan et al., "Radiation Dosimetry by Photostimulated Luminescence of CaSO:Dy", International Journal of Applied Radiation and Isotopes, vol. 28, 1977, pp. 534–535.

Primary Examiner—Janice A. Howell
Assistant Examiner—Richard Hanig

[57] ABSTRACT

The present invention constitutes a system for determining the amounts of ionizing radiation to which dosimeters using thermoluminescent materials have been exposed. In accordance with this system, the thermoluminescent materials which comprise the dosimeters are first cooled by contact with a cryogenic substance such as liquified nitrogen. The thermoluminescent materials are then optically stimulated by exposure to ultraviolet light. Thereafter, the amounts of visible light emitted by the thermoluminescent materials are detected and counted as the materials are allowed to warm up to room temperature. The amounts of luminescence exhibited by the materials are related to radiation exposure and provide a sensitive measure of radiation dosage. It has been discovered that the above procedure is most effective when heavily doped thermoluminescent materials are used and that the procedure allows many useful plastic materials to now be employed in dosimeter constructions.

15 Claims, 2 Drawing Sheets

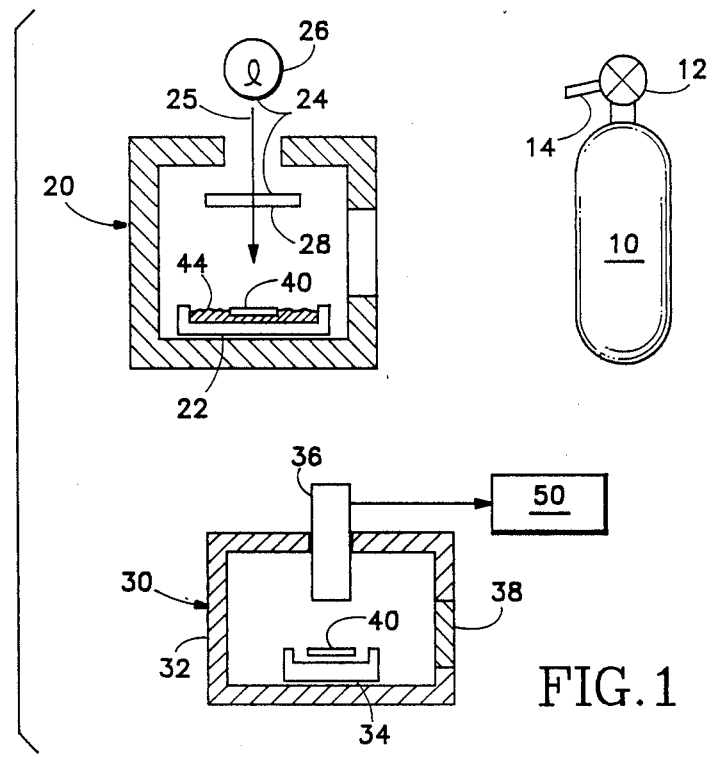
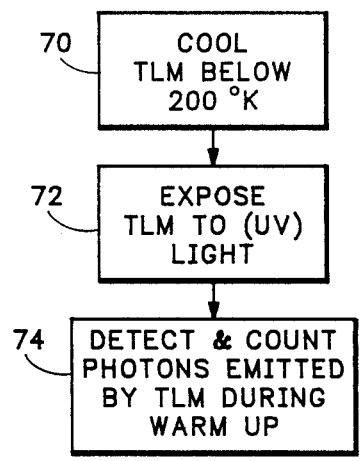
FIG.1
FIG.2

SYSTEM FOR USE WITH SOLID STATE DOSIMETER

BACKGROUND OF THE INVENTION

This invention was made with government support under contract number DE-AC06-76RLO 1830, awarded by the U.S. Department of Energy. The government has certain rights in the invention.

The present invention relates to radiation detection technology and more specifically to dosimeters which utilize thermoluminescent materials to measure radiation dosage.

Dosimeters which utilize thermoluminescent materials have been in widescale use for many years. The thermoluminescent materials employed in these devices comprise crystalline compounds which contain impurities and structural imperfections of various sorts such as missing atoms or ions and regions of misregistry between the planes of their crystal lattices. Some of these imperfections have the ability to capture or "trap" electrons and/or holes in excited states of the type generated by exposure to ionizing radiations such as gamma and beta radiation. The strength with which the electrons and holes are bound by such traps depends upon the nature of the trap and its depth. Traps are usually characterized by the thermal energy or the temperature to which the thermoluminescent material must be heated in order to insure release of the charges held by the traps. When these charges are released luminescence commonly occurs. The light quanta emitted may be photometrically detected and related to radiation exposure.

Therefore, dosimeters containing thermoluminescent materials are conventionally readout by being heated to about 260° C. while the intensity of the light emitted by the material is recorded in the form of a "glow curve", the size of which is representative of the amount of ionizing radiation absorbed by the dosimeter.

However, the above-described procedures (commonly referred to as "TLD" techniques) may be perceived to have a number of important drawbacks. Only traps of intermediate energy between about 470° K. and 570° K. can be readout since temperatures above this range can damage dosimeters. Consequently, the information represented by a large number of high energy traps is totally ignored. Further, at the higher temperatures used in such readouts substantial amounts of thermal quenching occur due to non-luminescence producing transitions whereby quantum efficiencies are significantly lowered. Additionally, the incandescent radiation produced by the thermoluminescent material raises the level of background noise thereby lowering the signal quality. Yet further, the use of elevated temperatures in the readout process limits the materials which may be used in dosimeter constructions and bars the use of all but a few specialized plastic materials.

It is, therefore, an object of the present invention to provide a system for using dosimeters containing thermoluminescent materials which utilizes high energy traps but operates at low temperatures to achieve higher accuracies and greater sensitivity in radiation detection.

It is another object of the present invention to provide a system for reading out dosimeters employing thermoluminescent materials which avoids thermal quenching problems and operates with high quantum efficiencies and which also avoids noise problems due to incandescent radiation.

It is a further object of the present invention to provide a system for using dosimeters employing thermoluminescent materials which allows constructions including plastic materials to be used in such dosimeters.

It is a yet further object of the present invention to provide a system for using dosimeters employing thermoluminescent materials which is accurate and highly sensitive yet is simple and rapid in operation.

SUMMARY OF THE INVENTION

The present invention constitutes a system for detecting the amounts of ionizing radiation to which dosimeters employing polycrystalline thermoluminescent materials have been exposed. In accordance with the present invention, the thermoluminescent materials comprising such dosimeters are first cooled to temperatures substantially below 200° K. The thermoluminescent material is then "optically stimulated" by exposure to ultraviolet light (e.g. 308 nm) in order to convert high energy traps to low energy traps. Thereafter, the visible light which is emitted by the thermoluminescent material is detected and counted as the material is allowed to warm up to room temperature. The amount of luminescence is linearly correlated with the radiation exposure of the dosimeter and provides a sensitive measure of radiation dosage.

In accordance with the preferred embodiment of the present invention, the thermoluminescent material should be a polycrystalline compound which is heavily doped with a metallic element (as compared to conventional thermoluminescent materials) to the extent of 1-15% by weight of dopant. The low temperature readout techniques enabled by the present invention allow for the utilization of many useful low melting plastic materials previously unusable in dosimeters. Such plastics may function as convenient carriers for the thermoluminescent material and/or as hydrogenous matrices which provide proton recoil effects as required in neutron dosimetry.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is a diagrammatic representation of the mechanical, electrical and optical components useful in practicing the system of the present invention;

FIG. 2 is a flow diagram of the essential process steps in the system of the present invention.

DESCRIPTION OF THE PREFERRED EMBODIMENT

Figure 3:
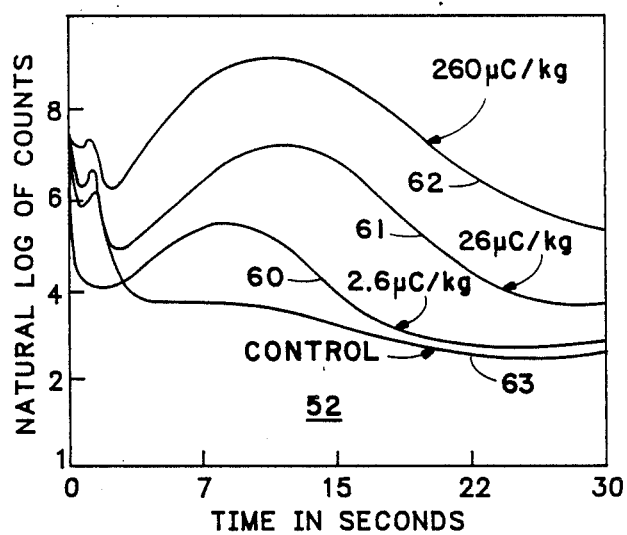
FIG. 3 is a graph illustrating low temperature "glow curves" corresponding to increasing radiation exposure as readout from a set of dosimeters in accordance with the system of the present invention.

The present invention constitutes a system for measuring dosages of ionizing radiation which may be practiced using the devices shown in FIG. 1 in accordance with the process steps shown in FIG. 2. Referring now to FIG. 1, the dewar flask 10 functions as a source of liquid nitrogen (77° K.) which may be dispensed through the valve 12 and spout 14 as required for cooling purposes to cryogenic temperatures. The sample exposure chamber 20 includes a set of insulated walls of a material such as styrofoam, a sample holding vessel 22, and a source 24 of ultraviolet light 25 such as a low-pressure mercury lamp 26 and a narrow bandpass filter 28 set to select 254 nm ultraviolet light. The sample readout chamber 30 comprises a light tight enclosure 32, a sample holding tray 34, a photomultiplier tube 36 and a door 38 through which the tray 34 can be accessed.

In operation, the sample holding vessel 22 is filled with liquid nitrogen 44. A sample 40 of a thermoluminescent material such as 30 milligrams of $CaF_2$:Mn from a dosimeter which has been exposed to ionizing radiation is then placed into the liquid nitrogen 44 in the vessel 22 and allowed to equilibrate to cryogenic temperatures (FIG. 2, step 70). Thereafter, the sample 40 is exposed to and "optically stimulated" by ultraviolet light (254 nm) from the light source 24 (FIG. 2, step 72). A 30 milligram sample should preferably be exposed to an amount of ultraviolet light equivalent to an amount of energy on the order of several millijoules.

The sample 40 is then removed from the sample exposure chamber 20 and quickly transferred to the sample readout chamber 30. The sample 40 is centered on the sample holding tray 34 and allowed to warm up to ambient temperature (i.e., room temperature or approximately 20° C.). The sample holding tray is specially designed to be of sufficient thermal mass and have good heat transfer properties so that the sample 40 will warm up into room temperature range at a relatively rapid rate within 30 to 40 seconds of being placed in the chamber 30. As the sample 40 warms to higher and higher temperatures and especially as it passes the 200° K. temperature level, it emits visible light (494 nm±50 nm) a substantial amount of which may be detected and amplified by the photomultiplier tube 36 (FIG. 2; step 74). The photomultiplier tube 36 is electrically connected to a recorder and display device 50 which counts the signal information supplied by the photomultiplier 36 and provides a display of the total amount of light released by the sample 40 (FIG. 2, also step 74). This total correlates with the dosage of radiation to which the thermoluminescent material was exposed.

Referring now to FIG. 3, the graph 52 shows four plot lines 60, 61, 62 and 63 which represent glow curves for four different dosimeter samples of a thermoluminescent material which is in this case comprised of $CaF_2$:Mn heavily doped with Mn to the extent of approximately three mole percent. Each of the samples corresponding to the lines 60, 61, 62 and 63 was exposed to a different amount of gamma radiation from a 137 Cs source, namely 2.6, 26.0 and 260.0 and 0.0 microcoulomb/Kg, respectively. The samples were cooled with liquid nitrogen and optically stimulated in accordance with the procedures previously described and outlined in FIG. 2, although, in this case, 351 nm excimer laser light was utilized to optically stimulate the samples with 50 pulses of light being applied to the samples at 60 $mJ/cm^2$/pulse. The plot lines 60, 61, 62 and 63 represent the log values of the visible light photon count rates of the luminescence of the samples over time as the samples were allowed to warm up to ambient temperature. The peaks on the far left of the plot lines 60, 61, 62 and 63 correspond to noise and should be ignored for current purposes. The graph 52 illustrates that both count rates and the count totals are linearly proportional to the radiation dosages absorbed by the samples.

The principles underlying the operation of the present invention involve the solid state physics of the "trapping" centers or sites which exist within thermoluminescent materials. As previously discussed in the background section, it is believed that exposure to ionizing radiation generates electrons and holes in excited states which can be "trapped" at these sites in such states for extended periods. Trapping sites may occur at many different energy levels or temperatures corresponding to the thermal energy levels at which the traps may be emptied by thermal effects. It should be noted that trapping sites are often referred to simply as "traps" and this term is also used to refer to such sites when they are associated with electrons and holes in an excited state. Traps may also be redistributed or "photoconverted" from higher to lower energy levels by exposure to light radiation of appropriate wavelengths when the lower energy traps are stable as determined by the temperature of the thermoluminescent material. It is believed that this photoconversion process involves the absorption of light quanta by electrons and holes at high energy traps through electric dipole transitions. These electrons and holes are thereby raised into excited states of sufficient energy to be within the conduction band for the phosphor material which allows them to become mobile and wander away from their original high energy trap sites. However, a large number of these electrons and holes are subsequently recaptured by low energy traps when the temperature of the material is sufficiently low.

In the present invention the thermoluminescent material is cooled to cryogenic temperatures to insure the stability of lower energy traps and especially traps around approximately 200° K. Exposure to sufficient ultraviolet light in the range of 200–400 nm may then photoconvert many high energy traps into lower energy traps which would ordinarily not be stable because they correspond to temperatures below ambient temperature. These lower energy traps may then empty as the thermoluminescent material is subsequently heated thereby causing light to be emitted which can be detected and counted.

This method of operation is highly desirable since it allows larger numbers of traps including many higher energy traps, such as the known 385° C. trap in $CaF_2$:Mn, which was previously inaccessible under prior art TLD techniques, to be used in reading out energy dosages. Furthermore, quantum efficiencies are greatly improved as thermal quenching is reduced when readouts are taken at lower temperatures, and noise due to incandescent radiation from the samples is substantially reduced during readout. Additionally, since photoconversion generally proceeds by partial stages, multiple readouts may be taken for single radiation exposures of target dosimeters which allows for verification of dosimeter readings in a manner previously not possible.

It has been discovered that the process defined in accordance with the present invention is most effective when the thermoluminescent material is heavily doped with a metallic element. The exact amounts of dopant will vary with the type of thermoluminescent material used and the nature of the dopant. However, approximately three mole percent of dopant is believed to be optimal, while amounts of dopant from one to fifteen mole percent should also be reasonably effective in enabling the present invention to be carried out with satisfactory dosage detection sensitivity. These amounts of dopant are high as compared to the thermoluminescent materials used in conventional dosimetry for which dopant concentrations are usually in the range of a few tenths of a percent by weight. Dopant concentrations have been limited in the past in order to avoid "concentration quenching" and attendant loss of sensitivity under conventional TLD techniques.

It is believed possible to use any of the conventional polycrystalline thermoluminescent materials in the present invention such as $CaF_2$, LiF, NaCl and $CaSO_4$, which are suitably doped with metallic elements. Any of the conventional dopants such as Mn, Mg, Ti, Ag, Ce, Pb and Dy may be employed, however, as previously noted, the dopant concentration should be relatively high compared to most thermoluminescent materials as conventionally used in dosimeters.

The present invention also enables many useful plastic materials which would have been melted during the heating phase of prior TLD techniques to be incorporated into dosimeter constructions. Such plastics may conveniently serve as carriers for thermoluminescent materials and/or as a source of hydrogen for proton recoil effects. In particular it is desirable to provide very thin layers of thermoluminescent material in beta dosimetry. Plastics provide an excellent medium for forming thin layers of thermoluminescent materials. Likewise, plastics can be used to form highly hydrogenous matrices in which 0.1–100 micron particles of large band-gap thermoluminescent crystals (such as calcium fluoride) can be embedded for neutron dosimetry. The hydrogen in the plastic allows for the neutrons to be detected through proton recoil effects while discrimination between gamma and neutron radiation can be accomplished through the use of small grain sizes.

The present invention additionally lends itself to use in a number of fields where TLD techniques were previously subject to limitations, such as neutron radiography and imaging, remote monitoring, battle field dosimetry, and environmental dosimetry. In particular, the present invention may be highly effective in battle field dosimetry because of its quickness and accuracy, and in environmental dosimetry because of its accuracy and great sensitivity.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for measuring the dosage of ionizing radiation to which a thermoluminescent material has been exposed, comprising the steps of:
    (a) cooling said thermoluminescent material down to a temperature substantially below 200° K.;
    (b) exposing said thermoluminescent material to light radiation in order to photoconvert high temperature traps into low temperature traps; and
    (c) detecting the light released by said thermoluminescent material as it is allowed to warm.

2. The method of claim 1, wherein said thermoluminescent material comprises a thermoluminescent material having a high dopant concentration of a metallic element.

3. The method of claim 2, wherein said thermoluminescent material comprises $CaF_2$ doped with approximately three mole percent of Mn.

4. The method of claim 1, further including the steps of:
    (a) again cooling said thermoluminescent material down to temperature substantially below 200° K.;
    (b) again exposing said thermoluminescent material to light radiation in order to photoconvert high temperature traps into low temperature traps; and
    (c) again detecting the light released by said thermoluminescent material as it is allowed to warm.

5. An apparatus for reading out the dosage of radiation to which a solid state thermoluminescent dosimeter had been exposed, comprising:
    (a) means for cooling said dosimeter to a cryogenic temperature;
    (b) means for exposing said dosimeter to light radiation in order to photoconvert high temperature traps into low temperature traps; and
    (c) means for detecting and counting the light emitted by said dosimeter as it is allowed to warm.

6. The apparatus of claim 5, wherein said dosimeter comprises a thermoluminescent material having a high dopant concentration of a metallic element.

7. The apparatus of claim 6 wherein said thermoluminescent material comprises $CaF_2$ doped with approximately three mole percent of Mn.

8. A thermoluminescent material adapted for use in dosimeters which are read out at low temperature after first being cooled and optically stimulated, said thermoluminescent material comprising:
    a polycrystalline compound which is doped with a metallic element in an amount of approximately one to fifteen mole percent.

9. The thermoluminescent material of claim 8, wherein said compound comprises a cation selected from the group consisting of the alkaline and alkaline earth elements and an anion selected from the group consisting of the halide elements.

10. The thermoluminescent material of claim 9, wherein said metallic dopant is selected from the group consisting of Mn, Mg, Ag, Pb, Ce and Dy.

11. The thermoluminescent material of claim 8, further comprising:
    a plastic material including substantial amounts of hydrogen for generating proton recoil interactions with neutrons in order to thereby allow neutron radiation to be measured.

12. The thermoluminescent material of claim 11, wherein said plastic material is of a low melting type.

13. A dosimeter adapted for use in detecting neutron radiation with thermoluminescent materials which are first cooled and optically stimulated before being read at out a low temperature, comprising:
    a plurality of finely divided particles of a thermoluminescent material including a polycrystalline compound heavily doped with a metallic element; and
    a hydrogenous matrix of a hydrogen rich plastic material in which said particles of thermoluminescent material are embedded.

14. The dosimeter of claim 13, wherein said particles of thermoluminescent material range in size from 0.1 to 100 microns.

15. The dosimeter of claim 13 wherein said polycrystalline material comprises $CaF_2$:Mn.

* * * * *